Jan. 18, 1966  A. B. GOULSTON  3,229,384
DRYING APPARATUS
Filed April 26, 1963
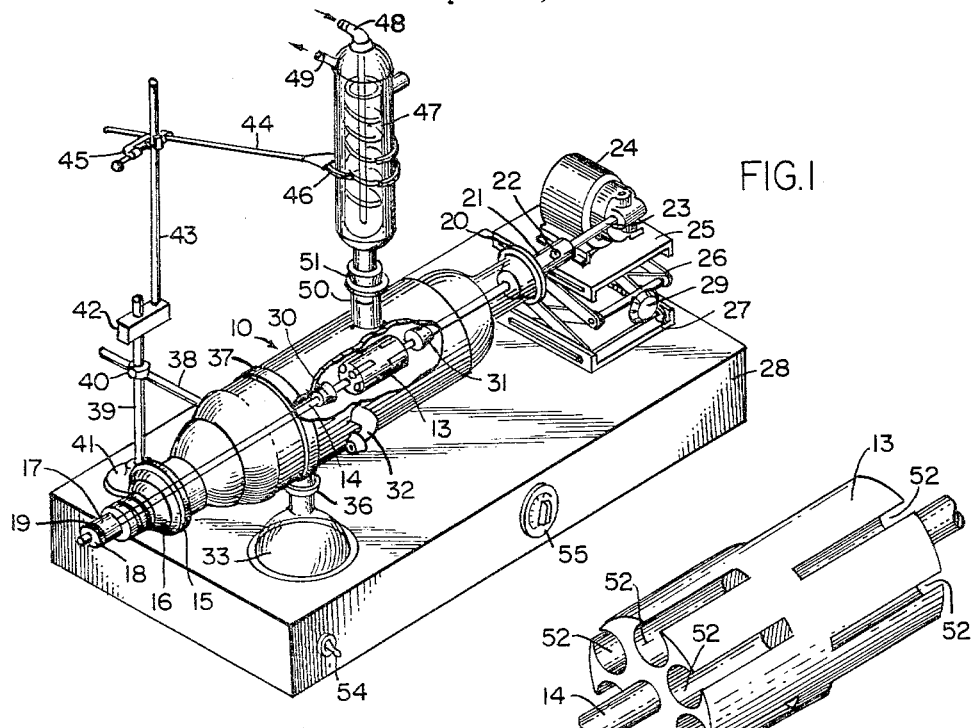
FIG. 1
FIG. 3
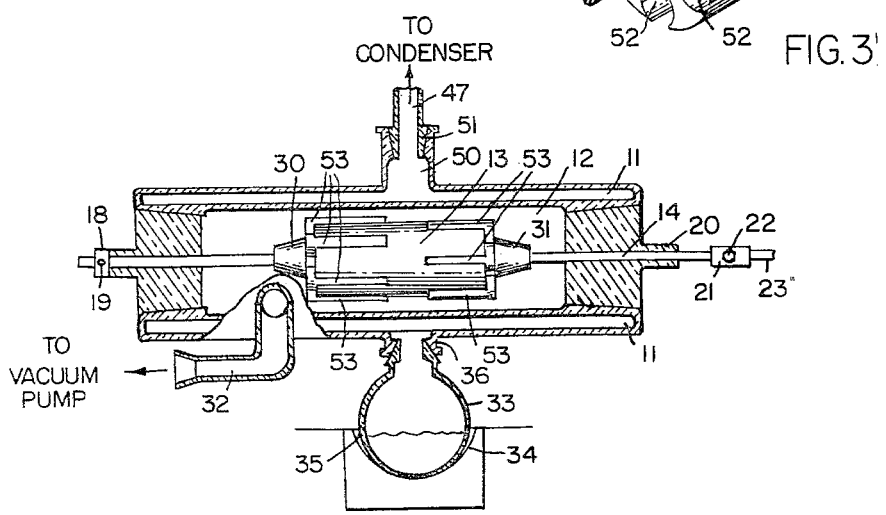
FIG. 2
INVENTOR.
ARTHUR B. GOULSTON
BY Alvin Isaacs
ATTORNEY 3,229,384
DRYING APPARATUS
Arthur B. Goulston, Cambridge, Mass., assignor to Metaloglass, Inc., Boston, Mass., a corporation of Massachusetts
Filed Apr. 26, 1963, Ser. No. 275,975
7 Claims. (Cl. 34—92)

This application relates to novel drying apparatus and, more particularly, to novel apparatus for drying chemical samples such as are prepared in research laboratories.

Chemical samples such as are prepared by laboratory research workers and technicians customarily have to be dried to remove moisture, solvents, etc. present in the sample. For example, in a typical chemical synthesis, the reactants employed in the preparation of the sample product are dissolved in a suitable solvent. Subsequent to preparation it is frequently necessary to remove all trace amounts of solvent as well as any moisture which may inherently be present in order to study and test the chemical and/or physical properties of the sample or to employ the sample as an intermediate in the synthesis of subsequent products.

There has long been a need by the organic synthesist or other research workers for a simple, rapid and efficient device to dry these laboratory samples, particularly a device which will dry a plurality of samples at the same time.

A primary object of this invention therefore is to provide a novel device for drying chemical samples or the like.

Another object is to provide a novel vacuum dryer.

Yet another object is to provide a novel rotary vacuum dryer having a revolving chamber which confines one or a plurality of chemical samples during the drying operation.

These and other objects of the invention will in part be obvious and will in part appear hereinafter.

For a fuller understanding of the nature and objects of the invention, reference should be had to the following detailed disclosure taken in conjunction with the accompanying drawings wherein:

FIGURE 1 is a perspective view illustrating the novel vacuum dryer of this invention with a portion of the outer wall broken away to show more clearly the revolving chamber housing the samples to be dried;

FIG. 2 is a partially sectional, partially schematic view of the vacuum dryer of FIGURE 1; and FIG. 3 is an enlarged perspective view showing in greater detail the revolving chamber which houses the samples during drying.

As was indicated heretofore, the present invention is directed primarily to a novel apparatus for drying chemical samples and the like prepared in the laboratory. More specifically, the present invention is directed primarily to a novel apparatus for drying a plurality of such samples in a single, relatively small but efficient apparatus and in a comparatively short time, thereby obviating a major problem confronting the analytical chemist or other research workers. Prior to the present invention, no such drying apparatus was available to satisfy this need.

The apparatus of this invention may be defined as a rotary vacuum dryer comprising, generally speaking, a drying chamber, means for confining a plurality of materials to be dried at spaced intervals within said chamber, and means for rotating said confining means. As distinguished from more conventional vacuum dryers where the material to be dried remains stationary during the drying operation, the present invention contemplates a revolving chamber which rotates the samples as they dry, thereby ensuring rapid, uniform drying. I have found that, not only is this a simple and efficient way for handling a plurality of samples, but also, significantly, the rotary action makes the drying as much as four times as fast as conventional stationary drying.

The rotary dryer of this invention accordingly comprises rotary means for confining a plurality of samples within a vacuum chamber and means to heat said chamber to facilitate drying of said samples confined therein.

The invention will be more readily understood by reference to the illustrative drawing.

As shown therein, the vacuum dryer 10 has an outer heating jacket 11 comprising an outer and an inner wall of glass or the like defining a chamber through which vapors of a heating fluid may reflux. The inner wall of jacket 11 in turn defines an inner drying compartment 12 open at both ends and in which a cylindrically shaped chamber 13 is rotatably suspended on a shaft 14 extending through the center thereof. The hollow center of chamber 13 is slightly larger in diameter than the diameter of shaft 14, so that the chamber will spin freely thereon. One end of shaft 14 extends through the center of the male member 15 of a ground glass ball joint fitted into cup-shaped female member 16 defining an opening at one end of the dryer; and a precision-ground glass bearing 17, fitting tightly into and releasably secured by the ball joint. It will be appreciated that when the ball joint and bearing are in place, a substantially airtight fit is provided at the said one end. A retaining collar 18 extends over the end of shaft 14 extending through bearing 17 and is held in place by screw 19 which frictionally engages the shaft. As will be apparent, the purpose of the retaining collar is to prevent lateral movement of the shaft towards the other end.

At the other end of the dryer, shaft 14 extends through a bearing, stopper or the like 20 releasably secured within the opening of the dryer at the said end to provide a substantially airtight enclosure thereof, and into a coupling 21 provided with a hex screw 22 where it is coupled with a motor shaft 23 of a suitable motor 24, e.g., a double gear-reduction universal type motor geared down to 18 r.p.m. Motor 24 is mounted on a platform 25 which may be raised or lowered by means of a lab jack 26 having a base portion 27 which in turn is mounted on a suitable bottom member or support 28 for the dryer. A jack screw 29 holds the jack in place at the desired height.

As chamber 13 will spin freely on shaft 14 and hence will not turn with the shaft, a pair of rubber stoppers or the like 30 and 31 are movably mounted on shaft 14. Although the stoppers are movable laterally along the shaft, they tightly engage the periphery of the shaft and hence rotate as the shaft turns. When stoppers 30 and 31 are spaced apart from chamber 13 (as shown in FIGURE 1), the chamber will spin on the shaft and hence will not rotate when the shaft is turned by the motor shaft. However, when the two stoppers are slid tightly against the respective ends of chamber 13, they provide a friction fit which causes the chamber 13 to turn with shaft 14. The purpose of this arrangement of elements will be more apparent hereinafter.

A conduit 32 connected to a vacuum pump or aspirator (not shown) leads into inner drying compartment 12 so as to be able to impress a vacuum therein.

A flask or the like 33 containing a suitable heating fluid or solvent 34 is positioned below dryer 10 with its bottom portion extending within support 28 onto a suitable heating mantle 35 secured to the underside of support 28. Heating mantles for flasks and the like are of course well known in the art. As an example of a useful mantle, mention may be made of the mantles described in United States Patent No. 2,282,078. Flask 33 is connected to the interior of heating jacket 11 by means of conduit 36.

Conduit 36 is releasably secured to flask 33 to provide access to the inside of the flask. A variable transformer (not shown) is preferably provided to control the heat emitted by mantle 35.

The end of the dryer opposite motor 24 is supported by a ring clamp 37 mounted on arm 38 of a conventional laboratory stand. Arm 38 is pivotally secured to upright 39 by a screw clamp 40 and upright 39 is mounted or held in base 41 which may or may not be secured to support 28 by screws or the like (not shown). A block 42 is pivotally mounted on upright 39 and houses one end of a second upright 43 to which arm 44 is secured by means of screw clamp 45. At the end of arm 44, a flexible "claw" clamp 46 frictionally engages and confines in a position substantially perpendicular to the dryer a conventional condenser 47, e.g., a Friedrichs' condenser. In typical manner, condenser 47 has an inlet 48 which may be connected to a suitable source of cooling fluid, e.g., cold tap water, compressed air, etc., and an outlet 49 for the said fluid. Condenser 47 is connected in water-tight relationship with a conduit 50 by means of a standard rubber stopper 51 through which the bottom of the condenser extends and conduit 50 in turn extends into jacket 11 to complete the refluxing system which will be described in more particularity hereinafter.

As illustrated more clearly in FIG. 3 cylindrical chamber 13 is provided with a plurality of recessed channels 52 at each end thereof. In a preferred embodiment, there may be as many as 12 of such channels, 6 at each end, although the exact number is not critical and may vary according to the number of samples a dryer of a given size may be desired to accommodate. The purpose of channels 52 is to confine one or more vials or containers 53 for the samples to be dried.

The operation of the novel dryer of this invention will now be described.

Hex screw 22 is loosened and shaft 14 is withdrawn slightly to the left to remove it from the motor shaft coupling 23. The lab jack screw 29 is loosened and the lab jack and motor are lowered. The male ground glass ball joint 15 is removed from female member 16 and shaft 14 and chamber 13 are removed. Stoppers 30 and 31 are slid along shaft 14 into the positions shown in FIGURE 1 so that the chamber can spin freely on the shaft and access can be had to channels 52 of the cylinder.

The samples or other materials to be dried are placed into vials or containers 53 adapted to slide into the recessed channels. It will be appreciated that the size and shape of the vials correspond substantially to the size and shape of the channels, so that accidental movement of the vials is minimized. The vials are provided with suitable means (not shown) for confining the sample therein but which will permit egress of air and vapors from the vials to inner chamber 13. Porous lids, membranes, loosely crimped aluminum foil, etc. may be employed for this purpose.

The vials confining the samples in the foregoing manner are placed in the respective channels of the chamber and rubber stoppers 30 and 31 are slid tightly against the two ends of the chamber (FIG. 2) to provide a friction engagement whereby the chamber is caused to rotate with the shaft. The shaft is then replaced in the dryer and reconnected to the motor and the dryer is now loaded.

The vacuum pump and motor are now turned on. As will be apparent, the samples to be dried are now caused to rotate while they are being vacuum dried. As was indicated heretofore, the tumbling action produced by the rotation of the samples during vacuum drying ensures a fast and uniform drying which reduces the drying time to as much as one-fourth the time required in conventional stationary vacuum drying.

In some instances, particularly where very mild drying conditions are required, the dryer may be operated in the absence of heat. However, in most instances, heat is desirable or necessary to accomplish the desired drying of the samples.

In those situations where heat is desired, the heating mantle and condenser are turned on and the variable transformer controlling the mantle is adjusted to a voltage at which the solvent in the flask is caused to reflux at a steady rate. To facilitate this operation, a control dial 55 is provided. It will be appreciated that dial 55 is connected by suitable wires (not shown) to the variable transformer in conventional manner.

The solvent or heating fluid in the flask boils and the vapors pass around the heating jacket, thereby heating the inner chamber and in turn the samples confined in the vials. The vapors pass up into the condenser where they are condensed and the condensed or liquid solvent then passes down and around the heating jacket to return to the flask where the refluxing is repeated in continuous fashion throughout the drying operation. It will thus be seen that the samples are never contacted by the heating fluid or vapors thereof at any time during the drying operation.

From the foregoing description, it will be apparent that the present invention provides a simple and efficient device for drying a plurality of laboratory samples or the like at a single time, thereby satisfying a long-felt need of research chemists and other laboratory technicians.

It will be appreciated that various changes may be made in the device described for purposes of illustration without departing from the scope of the invention.

Accordingly, it is to be expressly understood that the foregoing description and the accompanying drawings are by way of illustration only and the invention is not limited to the particular combination and arrangement of elements described and illustrated therein.

What is claimed is:

1. A device for drying chemical samples and like solid materials comprising means forming a drying chamber, said means comprising a heating jacket having an inner and an outer wall defining a chamber through which vapors of a heating fluid may reflux, said inner wall further defining the periphery of said drying chamber; a heating mantle positioned exterior to said heating jacket; a container having a heating fluid therein on said heating mantle; a first conduit releasably secured to said container, said conduit leading into the bottom of said heating jacket; a second conduit leading into the top of said heating jacket; a condenser releasably secured to said second conduit; a third conduit through which air may be removed from said drying chamber; a first shaft extending substantially horizontally through said drying chamber; a cylindrical member slidably mounted on said shaft and rotatable with respect thereto, said cylindrical member having a plurality of substantially horizontal recessed channels at spaced intervals, said channels being adapted to confine a plurality of containers of a solid material to be dried; a second shaft; means for coupling said first and second shaft; and drive means for rotating said shafts and said cylindrical member about a substantially horizontal axis.

2. A device for drying chemical samples and like solid maerials comprising means forming a drying chamber, said means comprising a heating jacket having an inner and an outer wall defining a chamber through which vapors of a heating fluid may reflux; said inner wall further defining the periphery of said drying chamber; means for refluxing a heating fluid through said heating jacket, thereby heating said drying chamber; means for removing air from said drying chamber; a shaft extending substantially horizontally through said drying chamber; a cylindrical member slidably mounted on said shaft and rotatable with respect thereto, said cylindrical member having a plurality of substantially horizontal recessed channels at spaced intervals, said channels being adapted to confine a plurality of containers of a solid material to be dried; said shaft and said cylindrical member being removable from said drying chamber for loading and unloading said containers; and drive means for rotating said shaft and cylindrical member about a substantially horizontal axis.

3. A device for drying chemical samples and like solid materials comprising means forming a drying chamber; means for heating said drying chamber; means for removing air from said drying chamber; a shaft extending substantially horizontally through said drying chamber; a cylindrical member slidably mounted on said shaft and rotatable with respect thereto, said cylindrical member having a plurality of substantially horizontal recessed channels at spaced intervals, said channels being adapted to confine a plurality of containers of a solid material to be dried, said shaft and said cylindrical member being removable from said drying chamber for loading and unloading said containers; and drive means for rotating said shaft and cylindrical member about a substantially horizontal axis.

4. A device for drying chemical samples and like solid materials comprising means forming a drying chamber, said means comprising a heating jacket having an inner and and outer wall defining a chamber through which vapors of a heating fluid may reflux, said inner wall further defining the periphery of said drying chamber; means for refluxing a heating fluid through said heating jacket, thereby heating said drying chamber; means for removing air from said drying chamber; a cylindrical member removably mounted within said drying chamber and rotatable about a substantially horizontal axis, said cylindrical member having a plurality of substantially horizontal recessed channels at spaced intervals, said channels being adapted to confine a plurality of containers of a solid material to be dried; and drive means for rotating said cylindrical member.

5. A device for drying chemical samples and like solid materials comprising means forming a drying chamber, said means comprising a heating jacket having an inner and an outer wall defining a chamber through which vapors of a heating fluid may reflux, said inner wall further defining the periphery of said drying chamber; means for refluxing a heating fluid through said heating jacket, thereby heating said drying chamber; a conduit leading into said drying chamber and through which air may be removed from said drying chamber; a shaft extending substantially horizontally through said drying chamber; means for housing a plurality of containers of a solid material to be dried, said means being slidably mounted on said shaft and rotatable with respect thereto, said means having a plurality of substantially horizontal recessed channels at spaced intervals, each of said channels being adapted to confine one of said plurality of containers of solid material; and drive means for rotating said shaft and said housing means about a subtantially horizontal axis.

6. A device for drying chemical samples and like solid materials comprising means forming a drying chamber; means for heating said drying chamber; means for removing air from said drying chamber; means for housing a plurality of containers of a solid material to be dried, said means being removably mounted within said drying chamber and rotatable about a substantially horizontal axis, said means having a plurality of substantially horizontal recessed channels at spaced intervals, each of said channels being adapted to confine one of said plurality of containers of solid material; and means for rotating said housing means.

7. A device for drying chemical samples and like solid materials comprising means forming a drying chamber; means for heating said drying chamber; means for removing air from said drying chamber; a shaft extending substantially horizontally through said drying chamber; a cylindrical member slidably mounted on said shaft and rotatable with respect thereto, said cylindrical member having a plurality of substantially horizontal recessed channels at spaced intervals, each of said channels being adapted to confine a container of a solid material to be dried, said shaft and said cylindrical member being removable from said drying chamber for loading and unloading of said container; at least one of said channels having confined therein a container open at one end thereof and adapted to receive said solid material to be dried, said container being positioned along its horizontal axis with the open end thereof extending toward the atmosphere of said drying chamber; a porous cover removably secured on said open end, whereby to permit egress of liquid from within said container while precluding passage therethrough of said solid material; and drive means for rotating said shaft and cylindrical member about a substantially horizontal axis.

References Cited by the Examiner

UNITED STATES PATENTS

| 440,752 | 11/1890 | Barotte | 159—6 |
|---|---|---|---|
| 1,321,288 | 11/1919 | Dalzell | 233—26 |
| 2,096,866 | 10/1937 | Thompson | 23—259 X |
| 2,447,330 | 8/1948 | Grebmeier. | |
| 2,512,604 | 6/1950 | Bierwirth | 159—6 |
| 2,865,445 | 12/1958 | Buchler | 159—25 |
| 2,917,229 | 12/1959 | Benedetto et al. | 233—26 X |

FOREIGN PATENTS 451,686  10/1948  Canada.

WILLIAM J. WYE, *Primary Examiner.*

NORMAN YUDKOFF, *Examiner.*